(12) United States Patent
Amouzadeh Tabrizi et al.

(10) Patent No.: US 10,865,105 B2
(45) Date of Patent: *Dec. 15, 2020

(54) FABRICATION OF NANOMOTORS AND APPLICATIONS THEREOF FOR SURFACE WRITING

(71) Applicants: Mahmoud Amouzadeh Tabrizi, Tehran (IR); Mojtaba Shamsipur, Tehran (IR); Reza Saber, Tehran (IR); Saeed Sarkar, Tehran (IR)

(72) Inventors: Mahmoud Amouzadeh Tabrizi, Tehran (IR); Mojtaba Shamsipur, Tehran (IR); Reza Saber, Tehran (IR); Saeed Sarkar, Tehran (IR)

( * ) Notice: Subject to any disclaimer, the term of this patent is extended or adjusted under 35 U.S.C. 154(b) by 390 days.

This patent is subject to a terminal disclaimer.

(21) Appl. No.: 15/866,485

(22) Filed: Jan. 10, 2018

(65) Prior Publication Data

US 2018/0127270 A1    May 10, 2018

Related U.S. Application Data

(60) Provisional application No. 62/457,830, filed on Feb. 11, 2017.

(51) Int. Cl.
| | |
|---|---|
| *B82B 3/00* | (2006.01) |
| *B05D 5/00* | (2006.01) |
| *B22F 1/00* | (2006.01) |
| *B82Y 15/00* | (2011.01) |
| *B82Y 40/00* | (2011.01) |
| *B82B 1/00* | (2006.01) |
| *B82Y 30/00* | (2011.01) |

(52) U.S. Cl.
CPC ............ *B82B 3/0014* (2013.01); *B05D 5/005* (2013.01); *B22F 1/0025* (2013.01); *B82B 3/0023* (2013.01); *B05D 2203/30* (2013.01); *B82B 1/002* (2013.01); *B82Y 15/00* (2013.01); *B82Y 30/00* (2013.01); *B82Y 40/00* (2013.01)

(58) Field of Classification Search
CPC ....... B82B 3/00; B82B 3/0014; B82B 3/0023; B82B 1/002; B05D 5/005; B05D 2203/30; B22F 1/0025; B82Y 15/00; B82Y 30/00; B82Y 40/00

USPC ......................................................... 588/320
See application file for complete search history.

(56) References Cited

U.S. PATENT DOCUMENTS

| | | | |
|---|---|---|---|
| 9,352,963 | B2 | 5/2016 | Wang et al. |
| 2013/0084569 | A1 | 4/2013 | Wang et al. |
| 2018/0117379 | A1* | 5/2018 | Amouzadeh Tabrizi ................... C25D 3/48 |

OTHER PUBLICATIONS

Aure'lie Goux et al., Prussian Blue electrodeposition within an oriented mesoporous silica film: preliminary observations, J Mater Sci, 2009, pp. 6601-6607, vol. 44.
Timothy R. Kline et al., Catalytic Nanomotors : Remote-Controlled Autonomous Movement of Striped Metallic Nanorods, Angewandte Chemie, 2005, pp. 744-746, vol. 44.
Kalayil Manian Manesh et al., Nanomotor-based 'writing' of surface microstructures, Chem. Commun., 2010, pp. 5704-5706, vol. 46.
Kalayil Manian Manesh et al., Nanomotor-based biocatalytic patterning of helical metal microstructures, Nanoscale, pp. 1310-1314 2013.

* cited by examiner

*Primary Examiner* — Edward M Johnson
(74) *Attorney, Agent, or Firm* — Bajwa IP Law Firm; Haris Zaheer Bajwa

(57) ABSTRACT

A method for surface writing is disclosed. The method includes fabricating a plurality of nanomotors, forming a secondary solution by adding the plurality of nanomotors to a primary solution placed on a substrate, guiding the plurality of nanomotors along a path in the secondary solution, and forming a sol-gel film along the path on a surface of the substrate. Wherein, the primary solution includes a monomer and hydrogen peroxide ($H_2O_2$). Fabricating the plurality of nanomotors includes preparing a mesoporous silica template, forming the plurality of nanomotors within the mesoporous silica template, and separating the plurality of nanomotors from the mesoporous silica template. The mesoporous silica template includes a plurality of channels, wherein each channel of the plurality of channels has a diameter less than about 50 nm and a length of less than about 100 nm, and each nanomotor of the plurality of nanomotors is formed within a channel of the plurality of channels.

20 Claims, 25 Drawing Sheets

FABRICATION OF NANOMOTORS AND APPLICATIONS THEREOF FOR SURFACE WRITING

CROSS-REFERENCE TO RELATED APPLICATION

This application claims the benefit of priority from U.S. Provisional Patent Application Ser. No. 62/457,830 filed on Feb. 11, 2017, and entitled "FABRICATION OF SMALL AND COST-EFFECTIVE NANOROD-SHAPED MOTOR AND APPLICATIONS THEREOF FOR THE SURFACE WRITING," which is incorporated herein by reference in its entirety.

SPONSORSHIP STATEMENT

This application has been sponsored by Iran Patent Office, which does not have any rights in this application.

TECHNICAL FIELD

The present disclosure generally relates to nanomotors, and particularly, to a method for surface writing using nanomotors.

BACKGROUND

Catalytic nanomotors are nanoscale-manufactured devices which may be propelled by different mechanisms and they may have many applications including drug delivery, surgery, isolation, sensing, environmental remediation and surface writing of microstructure. Up to now, various methods have been utilized for the synthesis of nanomotors. Among these, the template-based nanorod motors have become the preferred method for researchers. However, the perpetrated nanorod shape motors have generally micrometer scale and most of the used templates are expensive. Therefore, searching for an effective and low-cost template with nanochannels for synthesis of nanorod motors is still desirable.

Recently, nanomotors have been used for localized etching of the surfaces, for example for fixing a defect on a surface. Magnetically-guided nanomotors that can be conducted along a desirable path on a surface have been used for surface modifications, patterning and writing applications in microstructures. Such nanomotors have been used as a substrate for chemical or biological reagents and/or catalysts in order to perform a localized reaction; thereby, forming a deposited product on a surface along a controlled path. However, proposed methods involve using additional reagents that should be attached to the nanomotors for surface writing applications. Also, used nanomotors were in dimensions of micrometers, which may limit the obtained surface modifications only to microstructures.

Hence, there is a need for effective, and non-expensive methods and templates to fabricate nanomotors in nanometer scales that are applicable for several applications. Also, there is a need for nanomotors in nanometer scales and simpler shapes with enhanced properties for use in surface etching. In addition, there is a need for methods for surface writing based on nanomotors without a need for additional reagents and chemicals.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for surface writing. The method may include fabricating a plurality of nanomotors, forming a secondary solution by adding the plurality of nanomotors to a primary solution including a monomer and hydrogen peroxide ($H_2O_2$) placed on a substrate, guiding the plurality of nanomotors along a path in the secondary solution, and forming a sol-gel film along the path on a surface of the substrate. In an exemplary embodiment, $H_2O_2$ may be present in the primary solution with a concentration of between 1% wt and about 5% wt of the primary solution. Fabricating the plurality of nanomotors may include preparing a mesoporous silica template, forming the plurality of nanomotors within the mesoporous silica template, and separating the plurality of nanomotors from the mesoporous silica template. The mesoporous silica template may include a plurality of channels, where each channel of the plurality of channels may have a diameter less than about 50 nm and a length of less than about 100 nm, and each nanomotor of the plurality of nanomotors may be formed within a channel of the plurality of channels.

In an exemplary implementation, each nanomotor of the plurality of nanomotors may include a nanorod with a diameter of less than about 50 nm and a length of less than about 100 nm. In one exemplary embodiment, the each nanomotor of the plurality of nanomotors may include a nanorod with a diameter of less than about 10 nm and a length of less than about 50 nm.

In an exemplary implementation, the nanorod may include a first segment that may include a metal, and a second segment that may include a magnetic material. In one exemplary embodiment, the metal may include Platinum (Pt), or Palladium (Pd), or combinations thereof. In one exemplary embodiment, the magnetic material may include Nickel (Ni), or Cobalt (Co), or alloys of Ni, or alloys of Co, or combinations thereof.

In an exemplary implementation, the nanorod may further include a third segment that may include Gold (Au). Where, the second segment may be placed between the first segment and the third segment.

In an exemplary implementation, preparing the mesoporous silica template may include forming a mixture of tetraethoxysilane (TEOS) monomer and a surfactant, forming a hydrolyzed silica precursor within the mixture by aging the mixture under stirring at a pH value of 3, and depositing a film of the mesoporous silica template on a graphite electrode. Depositing the film of the mesoporous silica template on the graphite electrode may include immersing the graphite electrode in the mixture, and applying a voltage between about −2.5 V and about −2 V to the mixture. In one exemplary embodiment, the surfactant may include cetyltrimethylammonium bromide (CTAB).

In an exemplary implementation, forming the plurality of nanomotors within the mesoporous silica template may include depositing a sacrificial layer on the mesoporous silica template within each channel of the plurality of channels, depositing a first metal layer on the sacrificial layer, and depositing a second metal layer on the first metal layer. In one exemplary embodiment, the sacrificial layer may include a sacrificial material, which may include Prussian blue (PB) (Iron hexacyanoferrate), Nickel hexacyanoferrate (NiHCF), Cobalt hexacyanoferrate (CoHCF), Copper hexacyanoferrate, or combinations thereof. In one exemplary embodiment, the first metal layer may include Platinum (Pt), Palladium (Pd), or combinations thereof. In one exemplary embodiment, the second metal layer may include Nickel (Ni), Cobalt (Co), alloys of Ni, alloys of Co, or combinations thereof.

In an exemplary implementation, depositing the sacrificial layer on the mesoporous silica template within each channel of the plurality of channels may include immersing the mesoporous silica template in a solution of the sacrificial material, forming a $N_2$-saturated solution of the sacrificial material by $N_2$ saturating of the solution of the sacrificial material, and applying a voltage between about 0.2 V and about 0.4 V to the $N_2$-saturated solution of the sacrificial material under stirring the $N_2$-saturated solution of the sacrificial material. In an exemplary embodiment, the sacrificial material may include Prussian blue (PB) (Iron hexacyanoferrate), Nickel hexacyanoferrate (NiHCF), Cobalt hexacyanoferrate (CoHCF), Copper hexacyanoferrate, or combinations thereof.

In an exemplary implementation, depositing the first metal layer on the sacrificial layer may include immersing the mesoporous silica template with the sacrificial layer deposited within each channel of the plurality of channels in a first solution of a metal salt of Platinum (Pt), Palladium (Pd), or combinations thereof, forming a $N_2$-saturated first solution by $N_2$ saturating of the first solution, and applying a voltage between about −0.5V and about −0.4V to the $N_2$-saturated first solution while stirring the $N_2$-saturated first solution.

In an exemplary implementation, depositing the second metal layer on the first metal layer may include immersing the mesoporous silica template with the first metal layer deposited on the sacrificial layer in a second solution of a magnetic material, where the magnetic material may include Nickel (Ni), Cobalt (Co), alloys of Ni, alloys of Co, or combinations thereof, forming a $N_2$-saturated second solution by $N_2$ saturating of the second solution, and applying a voltage between about −1.2 V and about −1 V to the $N_2$-saturated second solution.

In an exemplary implementation, forming the plurality of nanomotors within the mesoporous silica template may further include depositing a third metal layer on the second metal layer, where the third metal layer may include Gold (Au). In one exemplary embodiment, depositing the third metal layer on the second metal layer may include immersing the mesoporous silica template with the second metal layer deposited on the first metal layer in a third solution of Gold (Au), forming a $N_2$-saturated third solution by $N_2$ saturating of the third solution, and applying a voltage between about −0.5 V and about −0.4 V to the $N_2$-saturated third solution.

In an exemplary implementation, separating the plurality of nanomotors from the mesoporous silica template may include immersing the mesoporous silica template containing the plurality of nanomotors in an alkaline solution. In another exemplary implementation, separating the plurality of nanomotors from the mesoporous silica template may include immersing the mesoporous silica template containing the plurality of nanomotors in a solution of Hydrogen Fluoride (HF).

In an exemplary implementation, guiding the plurality of nanomotors along the path in the secondary solution may include guiding the plurality of nanomotors along the path in the secondary solution by a magnetic field. In some exemplary implementations, forming the sol-gel film along the path on the surface of the substrate may include forming the sol-gel film within the secondary solution due to a polymerization process of the monomer, and depositing the sol-gel film along the path on the surface of the substrate.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
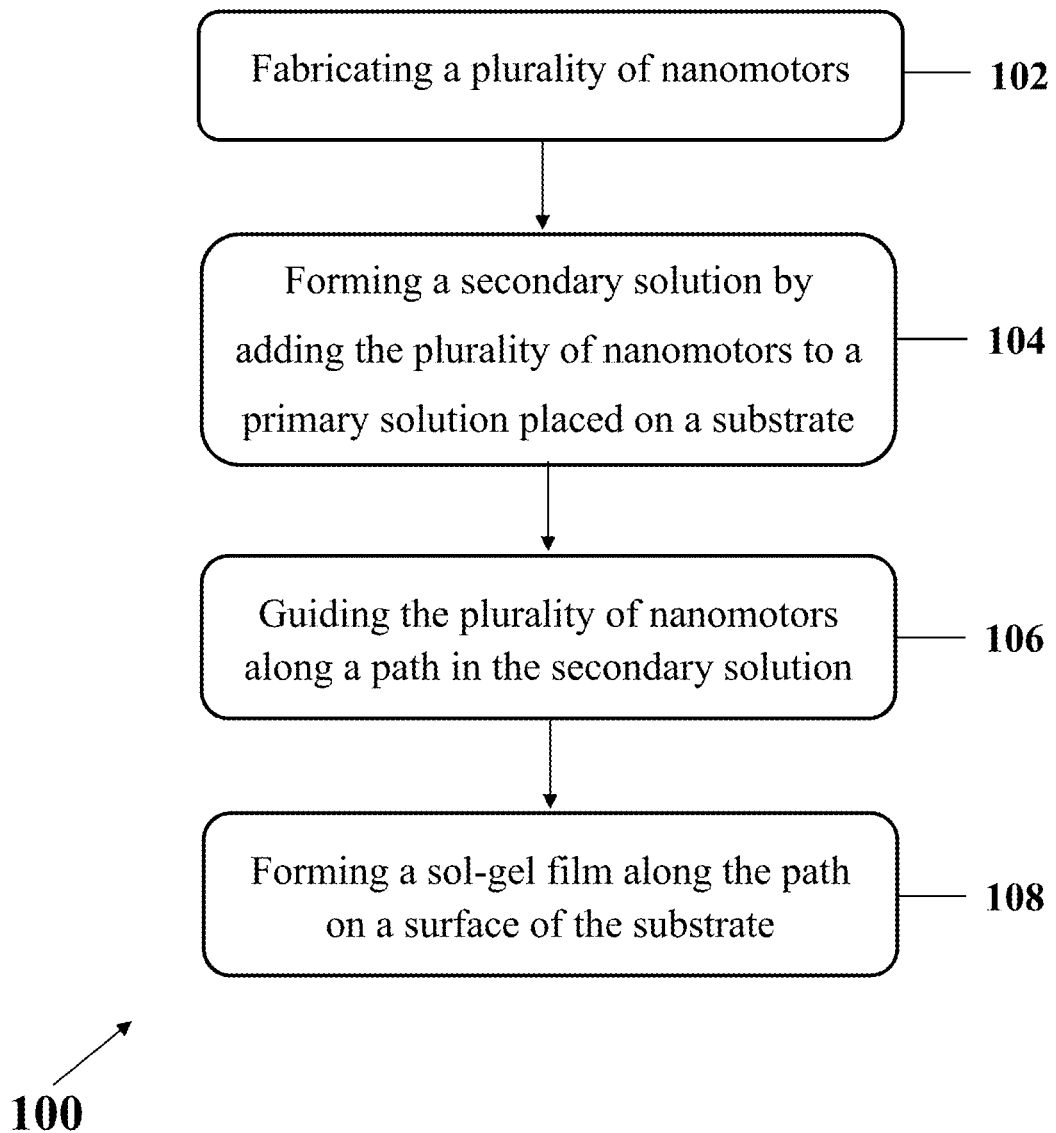
FIG. 1A illustrates a method for surface writing, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Catalytic nanomotors are nanoscale-manufactured devices which may be propelled by different mechanisms that basically convert chemical energy into autonomous motion. Exemplary nanorod motors are effective and may be synthesized at low-costs allowing for their commercially and technically viable use in several applications, for example, surface writing. Exemplary nanomotors may be utilized for surface modifications, such as fixing surface defects and cracks.

Utilization of micromotors has been very limited for surface writing, which involves attaching a reagent to the micromotors and guiding the micromotors in a solution of a monomer. Thereafter, a micro-structured pattern has been formed and deposited on a surface. However, the exemplary method involves essential use of the reagent, for example, using an enzyme as an reagent, that should be attached to the micromotors, may complicate the surface etching process and requires some essentials because of the high sensitivity of the enzyme to the environment conditions. For example, it may be required to keep micromotors in refrigerator or freezer for keeping the reagent active and in a stable state. In addition, the size of micromotors limits the applications to surface modifications/writing of at least micrometer dimensions.

The preparation of nano/micro surface-patterning structures on a surface may be an important goal of micro/nano fabrication. Compared with tip based scanning-probe (SP) techniques, using catalytic nanomotors for surface writing on a substrates may be relatively a more cost effective and simpler method. In the tip based SP techniques, the surface-patterning fabrication relies on the controlled movement of a functionalized tip along predetermined paths for a localized flat surface modification that require operators with a high level of experience.

Disclosed herein includes a simple exemplary method for the perpetration of nanorod shape motors using oriented mesoporous silica films obtained by electro-assisted self-assembly (EASA). The oriented mesoporous silica film may be used as a template for the fabrication of magnetically guided nanomotors. The exemplary fabricated template-based nanomotors may be shown to be extremely useful for surface writing applications. The exemplary nanomotor may be used for forming a nanostructured film on a surface using the nanomotors as a catalyst for the reaction of film formation and also for controlling the path of film deposited on the surface.

Herein, an exemplary method for fabricating magnetically-guided nanomotors by using the oriented mesoporous silica films as a template is disclosed. The method may be capable of producing nanorod-shaped nanomotors in nanometer scale by electrochemical deposition of metal inside the oriented mesoporous silica film that may be attributed to the presence of vertical connections of deposition paths from conductive substrates. The mesoporous silica film may include a number of cylindrical nanochannels so that metals like Pt, Au, and Ni may deposit into these nanochannels. Moreover, an exemplary method for surface writing using the exemplary fabricated nanomotors is disclosed. In an exemplary method, exemplary fabricated nanomotors may be utilized for writing on surfaces via depositing a sol-gel film along a controlled path of nanomotors movement. The exemplary method may include surface etchings in nanometer dimensions, and without any needs for an additional reagent or catalyst attached to the nanomotors. Moreover, an exemplary nanomotor including only two segments, for example, platinum/nickel (Pt—Ni) may be used efficiently.

FIG. 1A shows an exemplary method 100 for surface writing, consistent with exemplary embodiments of the present disclosure. Method 100 may include fabricating a plurality of nanomotors (step 102), forming a secondary solution by adding the plurality of nanomotors to a primary solution placed on a substrate (step 104), guiding the plurality of nanomotors along a path in the secondary solution (step 106), and forming a sol-gel film along the path on a surface of the substrate (step 108). The primary solution may include a monomer and hydrogen peroxide ($H_2O_2$).

In an exemplary embodiment, $H_2O_2$ may be present in the primary solution with a concentration between about 1% wt and about 5% wt of the primary solution. In an exemplary embodiment, the monomer may include ethel methoxysilane, vinyl tri-methoxysilane, benzyl tri-methoxysilan, methyl tri-ethoxysilane, ethel tri-ethoxysilane, vinyl tri-ethoxysilane, benzyl tri-ethoxysilane, diethoxydimethylsilan, or combinations thereof. Furthermore, the amount of monomer in the primary solution may depend on the amount of sol-gel film that may be needed to form onto the surface. In an exemplary embodiment, the monomer may include methyl tri-methoxy silane (MTMOS) with a concentration of about 0.1 mM in the primary solution.

Figure 1B:
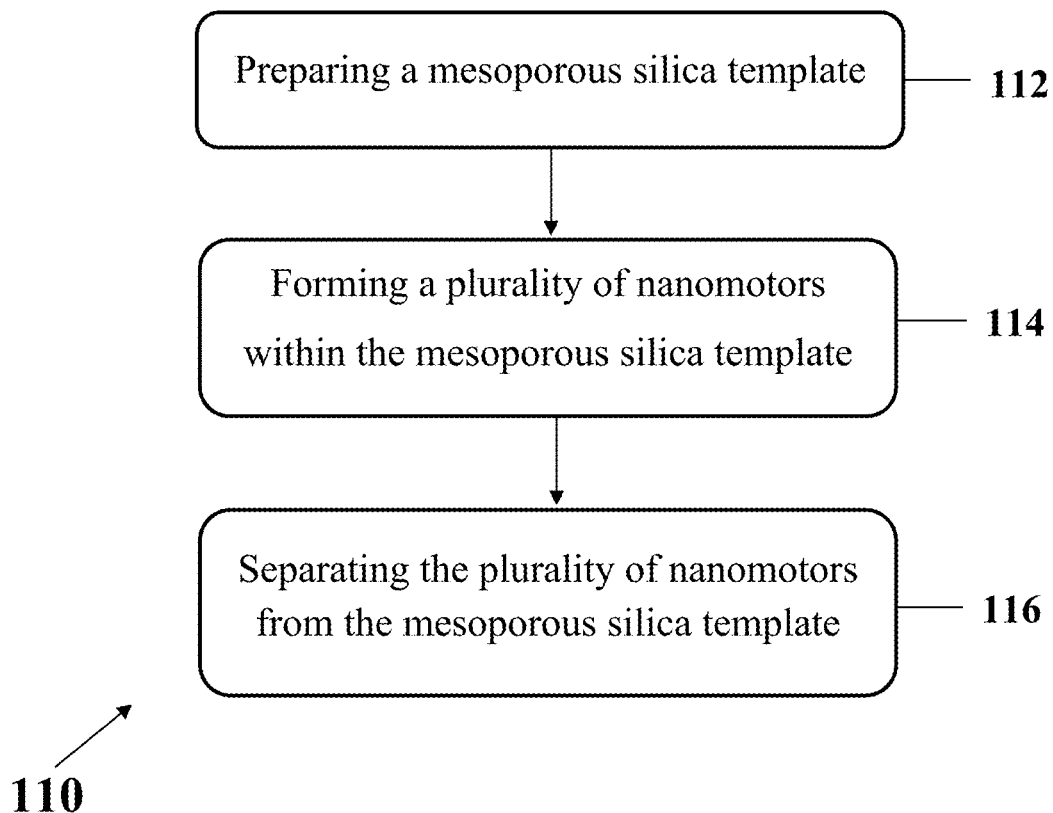
FIG. 1B illustrates a method for fabricating the plurality of nanomotors, consistent with one or more exemplary embodiments of the present disclosure.

Step 102 may include fabricating the plurality of nanomotors. FIG. 1B shows an exemplary method 110 for fabricating the plurality of nanomotors that may include an exemplary implementation of step 102, consistent with exemplary embodiments of the present disclosure. Method 110 may include preparing the mesoporous silica template (step 112), forming the plurality of nanomotors within the mesoporous silica template (step 114), and separating the plurality of nanomotors from the mesoporous silica template (step 116).

Figure 1C:
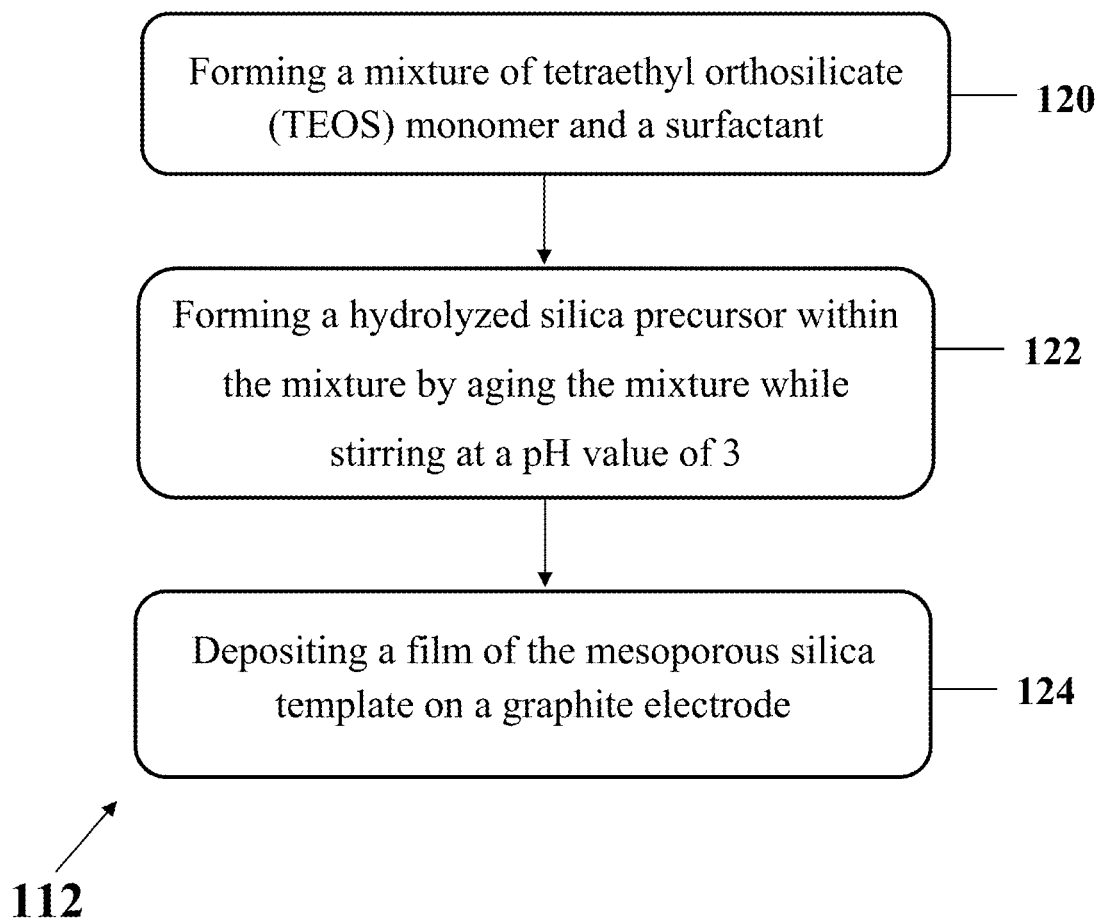
FIG. 1C illustrates a method for preparing the mesoporous silica template, consistent with one or more exemplary embodiments of the present disclosure.

Step 112 may include preparing the mesoporous silica template. FIG. 1C shows an exemplary implementation of step 112 including an exemplary process for preparing the mesoporous silica template, consistent with exemplary embodiments of the present disclosure. Referring to FIG. 1C, preparing the mesoporous silica template (step 112) may include forming a mixture of tetraethoxysilane (TEOS) monomer and a surfactant (step 120), forming a hydrolyzed silica precursor within the mixture by aging the mixture while stirring at a pH value of 3 (step 122), and depositing a film of the mesoporous silica template on a graphite electrode (step 124).

Step 120 may include forming a mixture of TEOS monomer and a surfactant by mixing the TEOS monomer and the surfactant. In an exemplary embodiment, the surfactant may include cetyltrimethylammonium bromide (CTAB).

Step 122 may include forming a hydrolyzed silica precursor within the mixture by aging the mixture while stirring at a pH value of 3. In an exemplary implementation, the mixture of the TEOS monomer and the surfactant obtained from step 120 may then be stirred at a constant pH value of about 3 to form the hydrolyzed silica precursor.

Step 124 may include depositing the film of the mesoporous silica template on the graphite electrode. In an exemplary implementation, step 124 may include immersing the graphite electrode in the mixture containing the formed hydrolyzed silica precursor and applying a voltage between about −2.5 V and about −2 V to the mixture, resulting in depositing of the film of the mesoporous silica template on the graphite electrode.

Figure 2A:
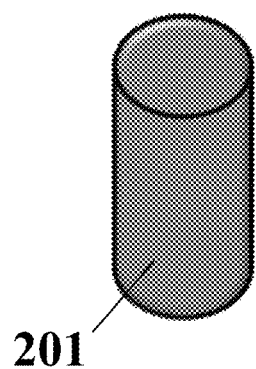
FIG. 2A illustrates a schematic view of an exemplary graphite electrode, consistent with one or more exemplary embodiments of the present disclosure.
Figure 2B:
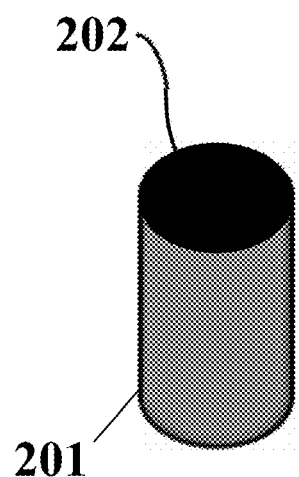
FIG. 2B illustrates a schematic view of an exemplary film of the mesoporous silica template formed on a surface of the exemplary graphite electrode, consistent with one or more exemplary embodiments of the present disclosure.

FIGS. 2A-2G show a schematic view of an exemplary implementation of method 110, consistent with one or more exemplary embodiments of the present disclosure. FIG. 2A shows a schematic view of an exemplary graphite electrode 201, consistent with one or more exemplary embodiments of the present disclosure. In an exemplary implementation of step 124, the exemplary graphite electrode 201 may be immersed in the mixture containing the formed hydrolyzed silica precursor and a voltage between about −2.5 V and about −2 V may be applied to the mixture. As a result, an exemplary film of the mesoporous silica template 202 may be formed on a surface of the exemplary graphite electrode 201 as shown in FIG. 2B.

Figure 2C:
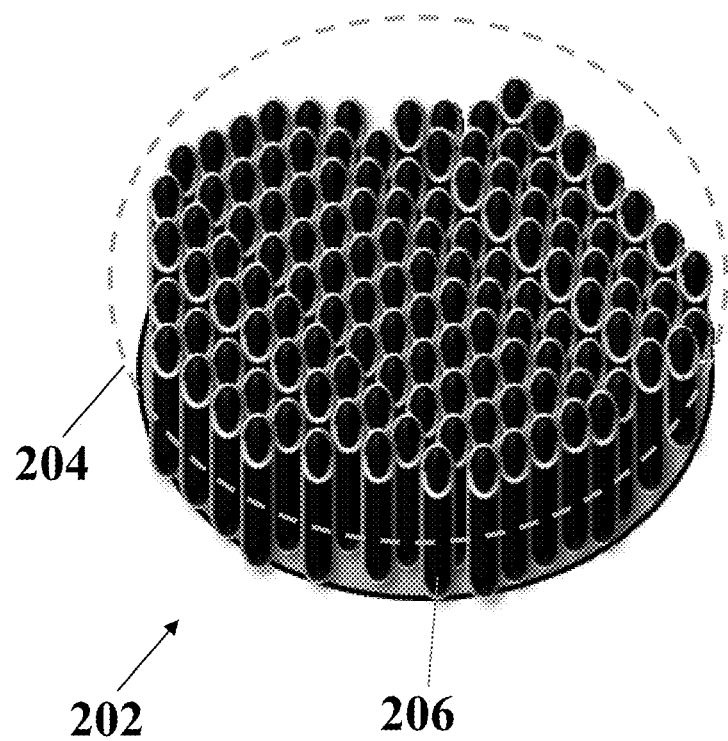
FIG. 2C illustrates a schematic view of an exemplary implementation of the prepared mesoporous silica template, consistent with one or more exemplary embodiments of the present disclosure.

FIG. 2C shows a schematic view of an exemplary implementation of the mesoporous silica template 202 prepared in step 112 of method 110, consistent with one or more exemplary embodiments of the present disclosure. In an exemplary implementation, the mesoporous silica template 202 may include a plurality of channels 204. In an exemplary embodiment, each channel 206 of the plurality of channels 204 has a diameter less than about 50 nm and a length of less than about 100 nm. In another exemplary embodiment, each channel 206 of the plurality of channels 204 has a diameter less than about 10 nm and a length of less than about 50 nm. In an exemplary embodiment, the mesoporous silica template 202 may include an oriented mesoporous silica template 202 as shown in FIG. 2C. The oriented mesoporous silica template 202 may include plurality of channels 204, which may be vertically oriented in a regular manner.

Step 112 may further include removing the graphite electrode 201 with the film of the mesoporous silica template 202 from the mixture, rinsing the graphite electrode 201 with the film of the mesoporous silica template 202, drying the graphite electrode 201 with the film of the mesoporous silica template 202 at a temperature between about 100° C. and about 150° C., removing/extracting the surfactant from the film of the mesoporous silica template 202 by immersing the graphite electrode 201 with the film of the mesoporous silica template 202 in a solution of ethanol and HCl under stirring, washing the graphite electrode 201 with the film of the mesoporous silica template 202, and blowing the graphite electrode 201 with the film of the mesoporous silica template 202 with Nitrogen ($N_2$).

Figure 1D:
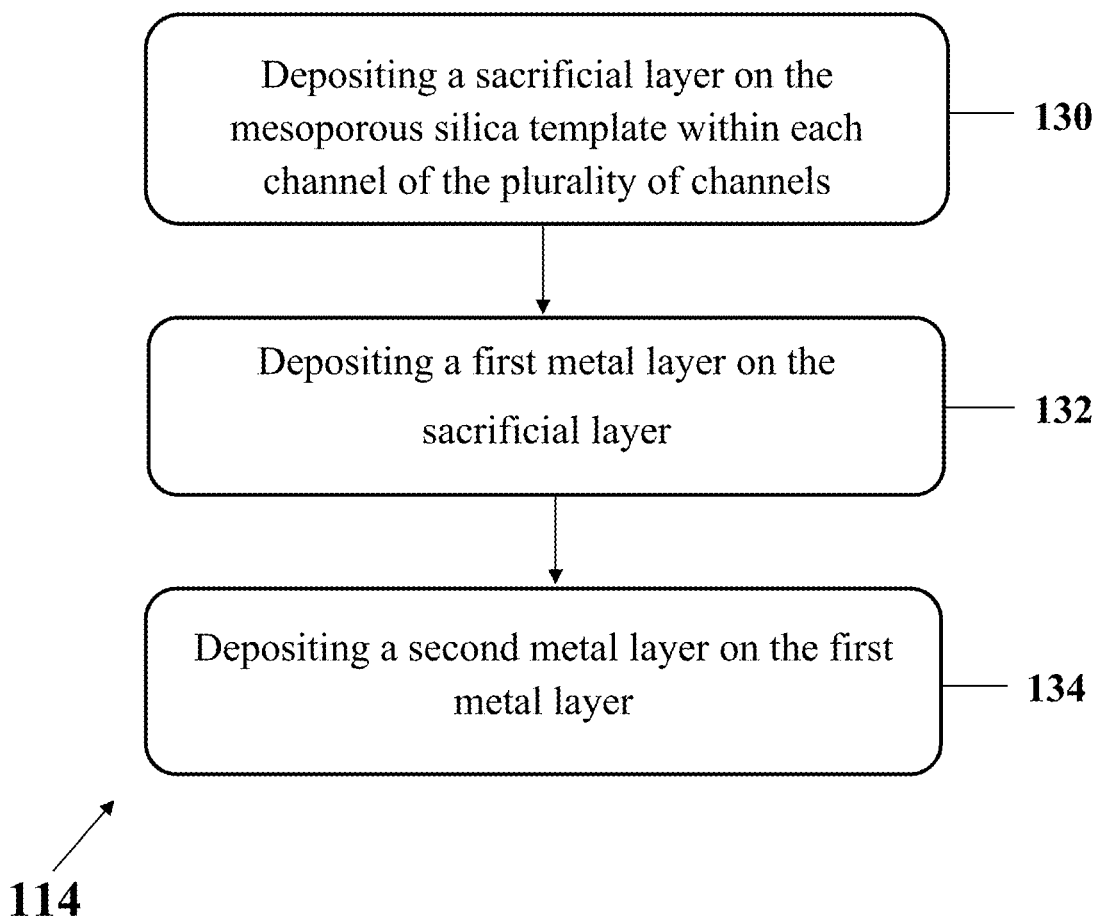
FIG. 1D illustrates an exemplary process for forming the plurality of nanomotors within the mesoporous silica template, consistent with one or more exemplary embodiments of the present disclosure.

Step 114 may include forming the plurality of nanomotors within the mesoporous silica template. FIG. 1D shows an exemplary implementation of step 114 including an exemplary process for forming the plurality of nanomotors within the mesoporous silica template, consistent with exemplary embodiments of the present disclosure. Referring to FIG. 1D, forming the plurality of nanomotors within the mesoporous silica template (step 114) may include depositing a sacrificial layer on the mesoporous silica template within each channel of the plurality of channels (step 130), depositing a first metal layer on the sacrificial layer (step 132), and depositing a second metal layer on the first metal layer (step 134). In an exemplary embodiment, the sacrificial layer may include a sacrificial material. The first metal layer may include platinum (Pt), palladium (Pd), or combinations thereof, and the second metal layer may include Nickel (Ni), Cobalt (Co), or combinations thereof.

Figure 2D:
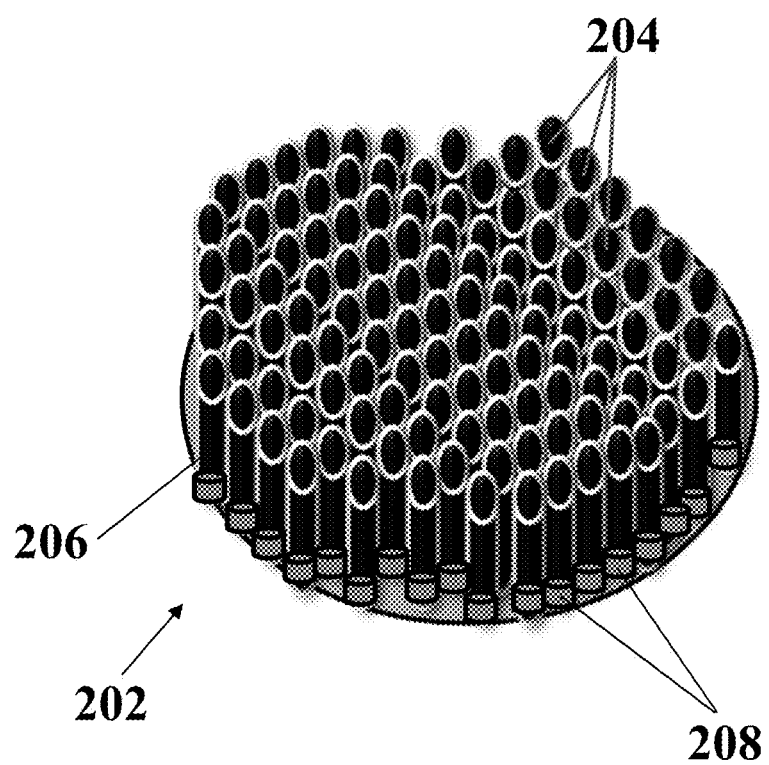
FIG. 2D illustrates a schematic view of an exemplary implementation of depositing a sacrificial layer on the mesoporous silica template within each channel of the plurality of channels, consistent with one or more exemplary embodiments of the present disclosure.

FIG. 2D shows a schematic view of an exemplary implementation of depositing a sacrificial layer 208 on the mesoporous silica template 202 within each channel 206 of the plurality of channels 204 (step 130), consistent with one or more exemplary embodiments of the present disclosure. In an exemplary implementation, depositing the sacrificial layer 208 on the mesoporous silica template 202 within each channel 206 of the plurality of channels 204 may include immersing the mesoporous silica template 202 in a solution of a sacrificial material, forming a $N_2$-saturated solution of the sacrificial material by $N_2$ saturating of the solution of the sacrificial material, and applying a voltage between about 0.2 V and about 0.4 V to the $N_2$-saturated solution of the sacrificial material under stirring the $N_2$-saturated solution of the sacrificial material. As a result, the sacrificial layer 208 may be formed on the mesoporous silica template 202 within each channel 206.

In an exemplary embodiment, $N_2$ saturating of a solution herein may refer to dissolving an amount of $N_2$ gas in the solution so that no more of $N_2$ gas can be dissolved in the solution.

In an exemplary embodiment, the sacrificial material may include Prussian blue (PB) (Iron hexacyanoferrate), Nickel hexacyanoferrate (NiHCF), Cobalt hexacyanoferrate (CoHCF), Copper hexacyanoferrate, or combinations thereof. In an exemplary embodiment, the solution of the sacrificial material may include a solution containing a ferricyanide salt, for example, potassium ferricyanide ($K_3Fe(CN)_6$), a chloride salt, and a salt of sodium (Na), potassium (K), or combinations thereof. The chloride salt may include $FeCl_3$, $NiCl_2$, $CoCl_2$, or combinations thereof. The salt of sodium (Na) or potassium (K) may include KCl, NaCl, $KNO_3$, or combinations thereof.

Figure 2E:
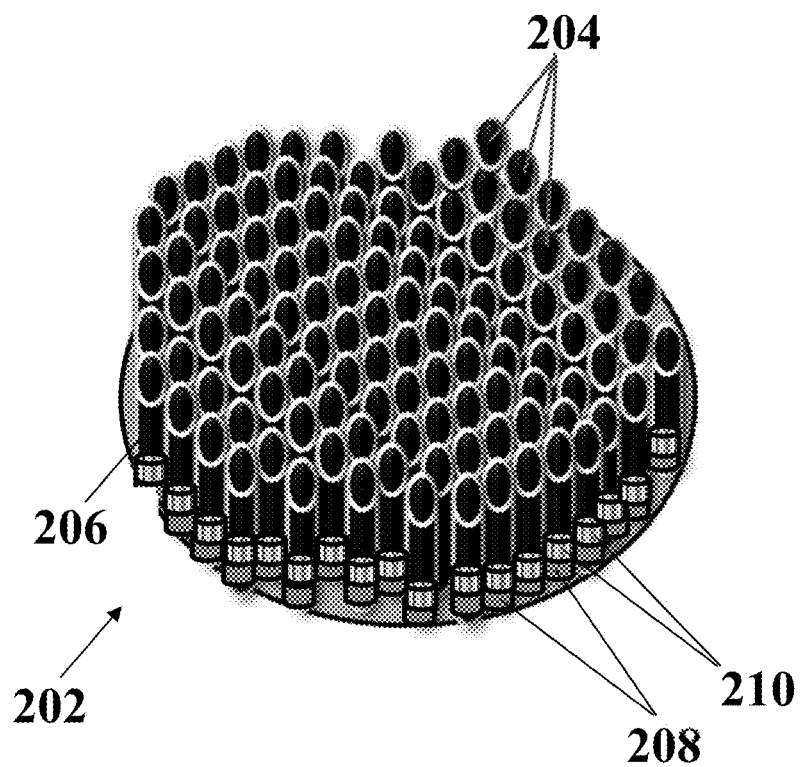
FIG. 2E illustrates a schematic view of an exemplary implementation of depositing a first metal layer on the sacrificial layer, consistent with one or more exemplary embodiments of the present disclosure.

FIG. 2E shows a schematic view of an exemplary implementation of depositing a first metal layer 210 on the sacrificial layer 208 (step 132), consistent with one or more exemplary embodiments of the present disclosure. In an exemplary implementation, depositing the first metal layer 210 on the sacrificial layer 208 may include depositing the first metal layer 210 on the sacrificial layer 208 within each channel 206 of the plurality of channels 204 of the mesoporous silica template 202.

In an exemplary implementation, depositing the first metal layer 210 on the sacrificial layer 208 (step 132) may include immersing the mesoporous silica template 202 with the sacrificial layer 208 deposited within each channel 206 of the plurality of channels 204 in a first solution of a metal salt of platinum (Pt), palladium (Pd), or combinations thereof, forming a $N_2$-saturated first solution by $N_2$ saturating of the first solution, and applying a voltage between about −0.5V and about −0.4V to the $N_2$-saturated first solution under stirring the $N_2$-saturated first solution. As a result, first metal layer 210 may be formed on the sacrificial layer 208 within each channel 206 of the mesoporous silica template 202.

Figure 2F:
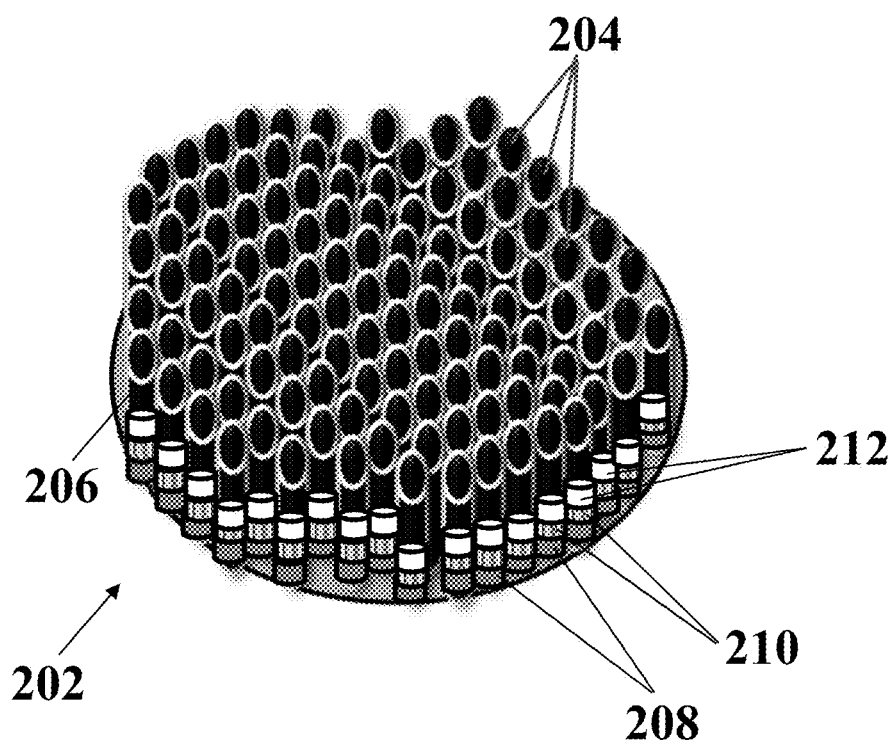
FIG. 2F illustrates a schematic view of an exemplary implementation of depositing a second metal layer on the first metal layer, consistent with one or more exemplary embodiments of the present disclosure.

FIG. 2F shows a schematic view of an exemplary implementation of depositing a second metal layer 212 on the first metal layer 210 (step 134), consistent with one or more exemplary embodiments of the present disclosure. In an exemplary implementation, depositing the second metal layer 212 on the first metal layer 210 may include depositing the second metal layer 212 on the first metal layer 210, which may be deposited on the sacrificial layer 208 within each channel 206 of the plurality of channels 204 of the mesoporous silica template 202.

In an exemplary implementation, depositing the second metal layer 212 on the first metal layer 210 (step 134) may include immersing the mesoporous silica template 202 with the first metal layer 210 deposited on the sacrificial layer 208 within each channel 206 of the plurality of channels 204 in a second solution of a magnetic material, for example, Nickel (Ni), Cobalt (Co), or combinations thereof, forming a $N_2$-saturated second solution by $N_2$ saturating of the second solution, and applying a voltage between about −1.2 V and about −1 V to the $N_2$-saturated second solution. As a result, second metal layer 212 may be formed on the first metal layer 210, which may be deposited on the sacrificial layer 208 within each channel 206 of the mesoporous silica template 202.

In an exemplary implementation, step 114 may further include depositing a third metal layer on the second metal layer. In an exemplary embodiment, the third metal layer may include gold (Au). The gold layer may be used as an adsorbent substrate for a reagent, for example, a biological catalyst, an enzyme, etc., which may be used as a further catalyst for a polymerization process of the monomer in order to form the sol-gel film that may be deposited on the surface of the substrate according to method 100.

Figure 1E:
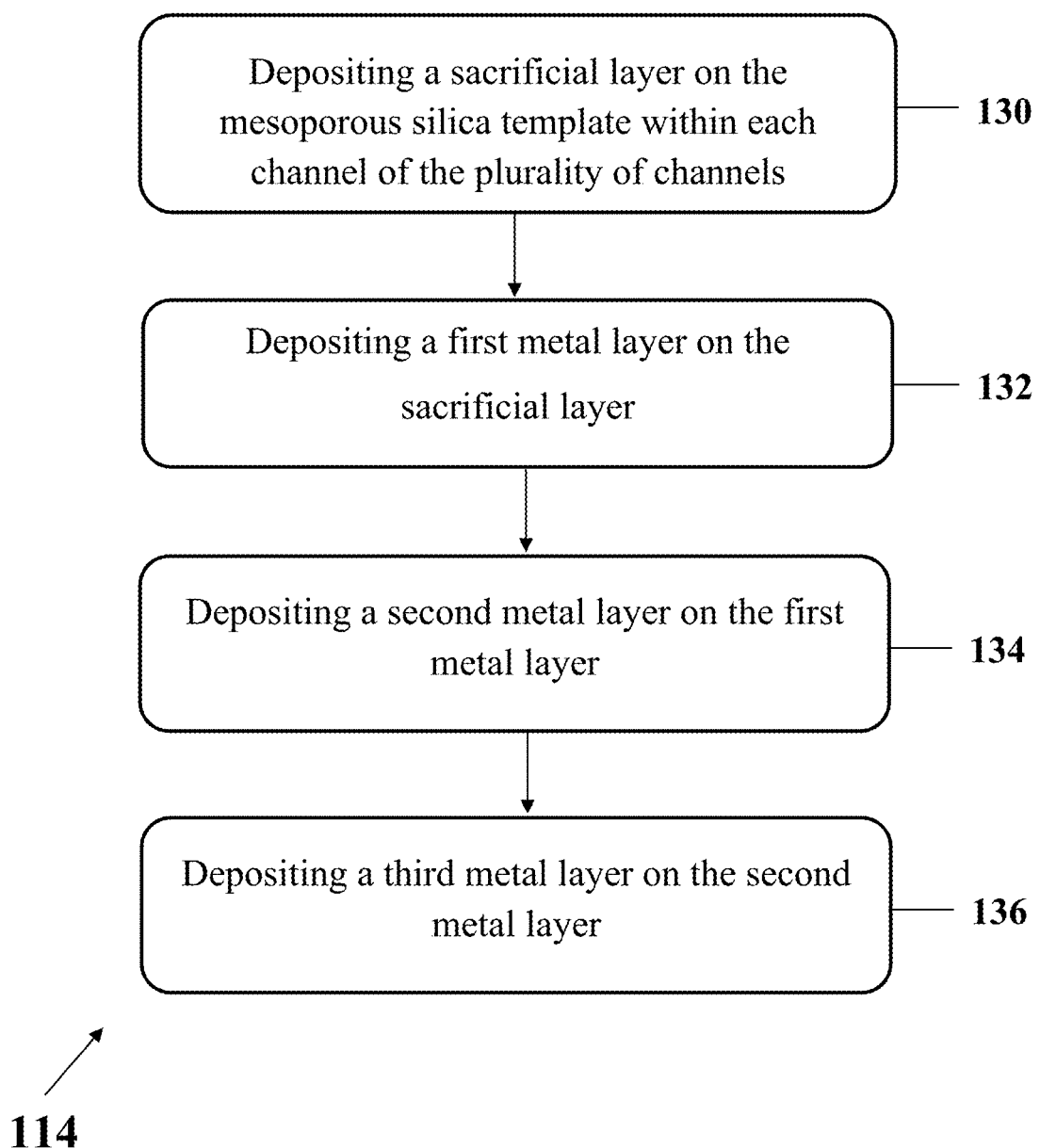
FIG. 1E illustrates an exemplary process for forming the plurality of nanomotors within the mesoporous silica template, consistent with one or more exemplary embodiments of the present disclosure.

FIG. 1E shows another exemplary implementation of step 114 representing an exemplary process for forming the plurality of nanomotors within the mesoporous silica template, consistent with exemplary embodiments of the present disclosure. Referring to FIG. 1E, forming the plurality of nanomotors within the mesoporous silica template (step 114) may include depositing a sacrificial layer on the mesoporous silica template within each channel of the plurality of channels (step 130), depositing a first metal layer on the sacrificial layer (step 132), depositing a second metal layer on the first metal layer (step 134), and depositing a third metal layer on the second metal layer (step 136). In an exemplary embodiment, the sacrificial layer may include a sacrificial material, which may include Prussian blue (PB) (Iron hexacyanoferrate), Nickel hexacyanoferrate (NiHCF), Cobalt hexacyanoferrate (CoHCF), Copper hexacyanoferrate, or combinations thereof. The first metal layer may include platinum (Pt), palladium (Pd), or combinations thereof, and the second metal layer may include Nickel (Ni), Cobalt (Co), or combinations thereof. Moreover, the third metal layer may include gold (Au).

Figure 2G:
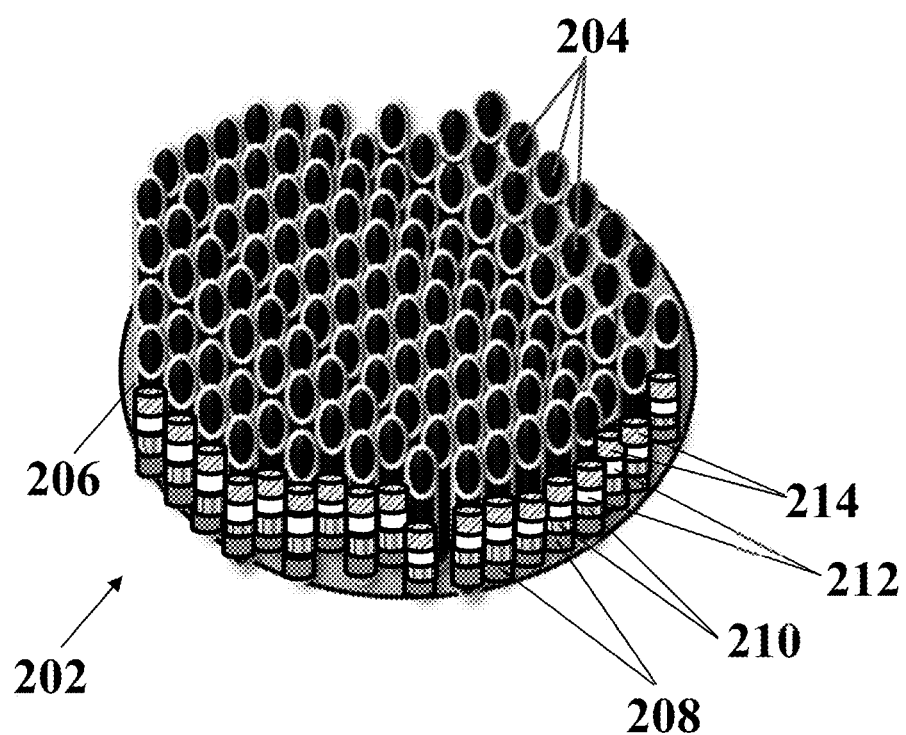
FIG. 2G illustrates a schematic view of an exemplary implementation of depositing a third metal layer on the second metal layer, consistent with one or more exemplary embodiments of the present disclosure.

FIG. 2G shows a schematic view of an exemplary implementation of depositing a third metal layer 214 on the second metal layer 212 (step 136), consistent with one or more exemplary embodiments of the present disclosure. In an exemplary implementation, depositing the third metal layer 214 on the second metal layer 212 may include depositing the third metal layer 214 on the second metal layer 212, which may be deposited on the first metal layer 210 within each channel 206 of the plurality of channels 204 of the mesoporous silica template 202.

In an exemplary implementation, depositing the third metal layer 214 on the second metal layer 212 (step 136) may include immersing the mesoporous silica template 202 with the second metal layer 212 deposited on the first metal layer 210, which may deposited on the sacrificial layer 208 within each channel 206 of the plurality of channels 204 in a third solution of gold (Au), forming a $N_2$-saturated third solution by $N_2$ saturating of the third solution, and applying a voltage between about −0.5 V and about −0.4 V to the $N_2$-saturated third solution. As a result, third metal layer 214 may be formed on the second metal layer 212, which may be deposited on the first metal layer 210 that may be deposited on the sacrificial layer 208 within each channel 206 of the mesoporous silica template 202.

Step 114 may include forming the plurality of nanomotors within the mesoporous silica template 202 as described hereinabove, so that a nanomotor may be formed within each channel 206 of the plurality of channels 204 of the mesoporous silica template 202. As a result, the plurality of nanomotors may be formed within the mesoporous silica template 202.

Figure 2H:
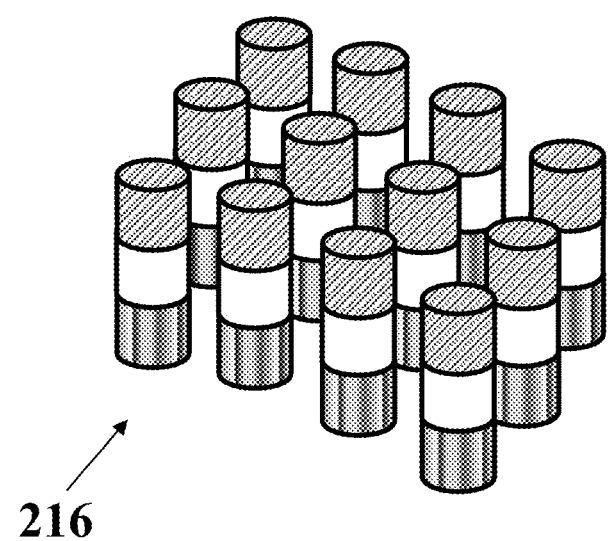
FIG. 2H illustrates a schematic view of an exemplary implementation of the plurality of nanomotors separated from the mesoporous silica template, consistent with one or more exemplary embodiments of the present disclosure.

Step 116 may include separating the plurality of nanomotors from the mesoporous silica template 202. In an exemplary embodiment, separating the plurality of nanomotors from the mesoporous silica template 202 may include immersing the mesoporous silica template 202 containing the plurality of nanomotors in an alkaline solution, for example, a solution of NaOH or KOH. The alkaline solution may have a pH value of about 13 or more. In another exemplary embodiment, separating the plurality of nanomotors from the mesoporous silica template 202 may include immersing the mesoporous silica template 202 containing the plurality of nanomotors in a solution of Hydrogen Fluoride (HF). As a result, the plurality of nanomotors formed within the plurality of channels 204 of the mesoporous silica template 202 may be separated from the mesoporous silica template 202 and the sacrificial layer 208. FIG. 2H shows a schematic view of an exemplary implementation of the plurality of nanomotors 216 that may be separated from the mesoporous silica template 202, consistent with one or more exemplary embodiments of the present disclosure.

Figure 3A:
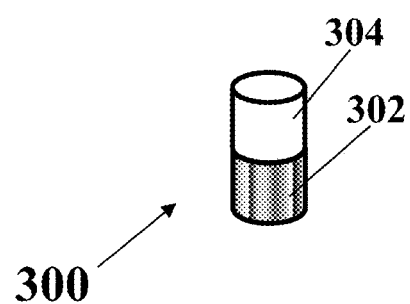
FIG. 3A illustrates a schematic view of an exemplary implementation of a nanomotor of the plurality of nanomotors including a first segment, and a second segment, consistent with one or more exemplary embodiments of the present disclosure.
Figure 3B:
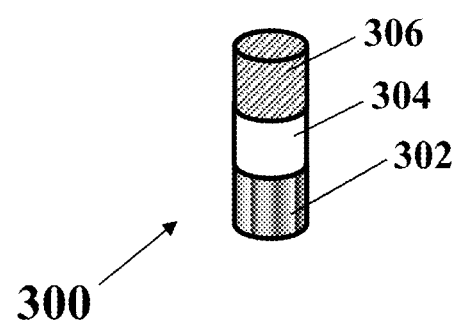
FIG. 3B illustrates a schematic view of an exemplary implementation of a nanomotor of the plurality of nanomotors including a first segment, a second segment, and a third segment, consistent with one or more exemplary embodiments of the present disclosure.

FIGS. 3A and 3B show schematic views of two different exemplary implementations of a nanomotor 300 of the plurality of nanomotors 216 which may be formed in step 114 and then may be separated in step 116, consistent with one or more exemplary embodiments of the present disclosure. Nanomotor 300 may include a nanorod 300 with a diameter of less than about 50 nm and a length of less than about 100 nm. In an exemplary embodiment, nanomotor 300 may include the nanorod 300 with a diameter of less than about 10 nm and a length of less than about 50 nm. Exemplary nanomotor 300 may be used for surface writing, for example, surface repairing or repairing of a scratch on a surface. For example, the small size of the exemplary nanomotor 300 may make the exemplary nanomotor 300 appropriate for repairing of a small-size scratch on a surface of a platform. Whereas, a nanomotor in larger dimensions, for example, micromotors may only make bulges on the surface of the platform.

Referring to FIG. 3A, nanorod 300 may include a first segment 302 and a second segment 304. In an exemplary embodiment, the first segment 302 may include a metal, which may include platinum (Pt), palladium (Pd), or combinations thereof. Moreover, the second segment 304 may include a magnetic material, which may include Nickel (Ni), Cobalt, or combinations thereof.

Referring to FIG. 3B, nanorod 300 may further include a third segment 306, where the second segment 304 may be placed between the first segment 302 and the third segment 306. Nanorod 300 may include the first segment 302, the second segment 304, and the third segment 306. In an exemplary embodiment, the first segment 302 may include a metal, which may include Platinum (Pt), Palladium (Pd), or combinations thereof. The second segment 304 may include a magnetic material, which may include Nickel (Ni), Cobalt, or combinations thereof. In addition, the third segment 306 may include gold (Au).

Referring again to FIG. 1A, as a representation of exemplary method 100 for surface writing, step 104 may include forming a secondary solution by adding the plurality of nanomotors 216 to a primary solution placed on a substrate. The primary solution may include a monomer and $H_2O_2$. In an exemplary embodiment, $H_2O_2$ may be present in the primary solution with a concentration between about 1% wt and about 5% wt of the primary solution. Furthermore, the amount of the monomer in the primary solution may depend on the amount of the sol-gel film that may be needed to form onto the surface. In an exemplary embodiment, the monomer may include ethel methoxysilane, vinyl tri-methoxysilane, benzyl tri-methoxysilan, methyl tri-ethoxysilane, ethel tri-ethoxysilane, vinyl tri-ethoxysilane, benzyl tri-ethoxysilane, diethoxydimethylsilan, or combinations thereof. In an exemplary embodiment, the monomer may include methyl tri-methoxy silane (MTMOS) with a concentration of about 0.1 mM in the primary solution.

It should be noted that in exemplary method 100 for surface writing, $H_2O_2$ may have a binary role. $H_2O_2$ may decompose in the secondary solution via a decomposition reaction catalyzed by the plurality of nanomotors 216. In an exemplary embodiment, the first segment 302 of the plurality of nanomotors 216 may act as a catalyst for decomposition of $H_2O_2$; thereby, forming Oxygen bubbles ($O_2$) and Hydrogen ions (Hf). Accordingly, $H_2O_2$ may act as a source of Oxygen bubbles ($O_2$), which may induce a movement of the plurality of nanomotors. Accordingly, $H_2O_2$ may act as a fuel for the plurality of nanomotors 216 to motivate the plurality of nanomotors 216 within the secondary solution. On the other hand, the produced $H^+$ from the decomposition of $H_2O_2$ in the presence of the plurality of nanomotors 216 may act as a catalyst for polymerization of the monomer within the secondary solution. Therefore, a sol-gel film may be produced as a product of the polymerization of the monomer.

Figure 4:
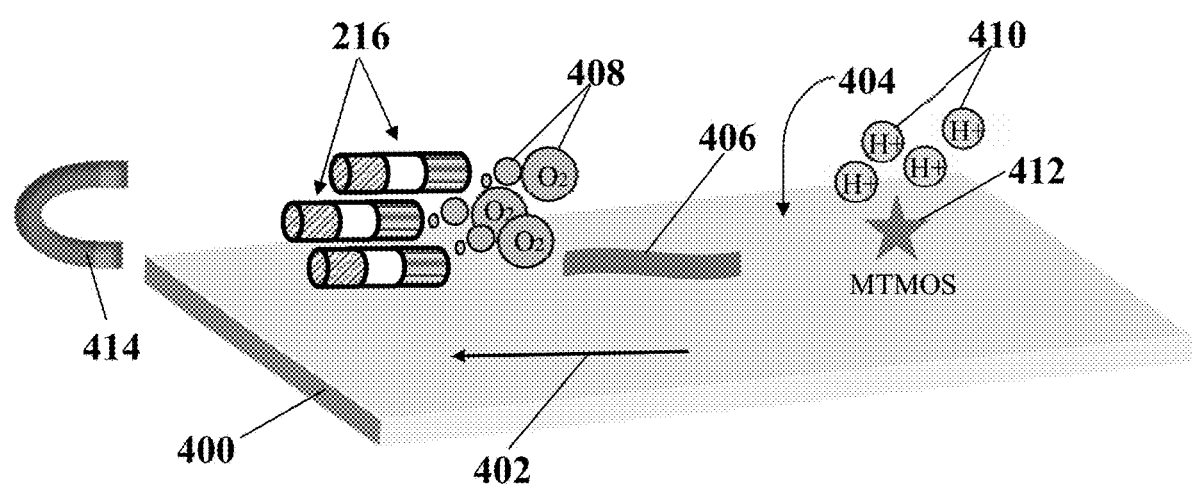
FIG. 4 illustrates a schematic view of guiding the plurality of nanomotors along an exemplary path in the secondary solution, and forming an exemplary sol-gel film along the exemplary path on a surface of a substrate, consistent with one or more exemplary embodiments of the present disclosure.

FIG. 4 shows a schematic view of steps 106 and 108, including guiding the plurality of nanomotors 216 along the exemplary path 402 in the secondary solution, and forming exemplary sol-gel film 406 along path 402 on an exemplary surface 404 of substrate 400, consistent with one or more exemplary embodiments of the present disclosure. In an exemplary embodiment, step 106 may include guiding the plurality of nanomotors 216 along the path 402 in the secondary solution by a magnetic field that may induced by an exemplary magnet 414.

In an exemplary embodiment, as the plurality of nanomotors 216 may being moved along path 402 that may be controlled in a desired path by the magnet 414, a decomposition process of $H_2O_2$ may happen that may be catalyzed by the plurality of nanomotors 216. Thereafter, the products of $H_2O_2$ decomposition, including $O_2$ bubbles 408, as a fuel for movement of the plurality of nanomotors 216, and $H^+$ ions 410, as a catalyst for polymerization of monomer 412 may form behind the plurality of nanomotors 216 while moving within the secondary solution. As a result, the sol-gel film 406 may be in-situ formed and deposited on surface 404 along the path 402 that may be controlled and directed by magnet 414.

In an exemplary implementation, step 108 may include forming the sol-gel film 406 within the secondary solution due to a polymerization process of the monomer, and depositing the sol-gel film 406 along exemplary path 402 on exemplary surface 404 of substrate 400. In an exemplary embodiment, the monomer 412, for example, MTMOS may be polymerized and the sol-gel film 406 may be obtained, which may be deposited/precipitated along the path of the movement of the plurality of nanomotors 216 onto the surface 404.

In some exemplary implementations, method 100 may be used for repairing surface defects from different surfaces, for example, metal or glass surfaces. In other implementations, method 100 may be used for patterning or writing microstructures or nanostructures on a surface.

Example 1

Fabrication of Oriented Mesoporous Silica Template

In this example, an exemplary plurality of nanomotors were fabricated using oriented mesoporous silica films obtained by electro-assisted self-assembly (EASA). An oriented mesoporous silica modified electrode was prepared according to the following procedure. Briefly, tetraethoxysilane (TEOS, 99%, 75 mM) and cetyltrimethylammonium bromide (CTAB, 99%, 24 mM) were added to a typical solution including about 20 mL of ethanol, and about 20 mL of an aqueous solution of $NaNO_3$ (0.1 M) under stirring. HCl (36%) was added in order to reach a pH value of about 3. The solution was aged while stirring for about 2.5 hours at pH value of about 3 in order to produce hydrolyzed precursors before the electrosynthesis of mesoporous silica process. Then, a graphite rod electrode (0.5 cm diameter, and 2 cm length) was immersed in the obtained aged solution and a voltage of about −2.2 V versus Ag|AgCl|KClsat was applied for about 20 seconds in order to generate the necessary hydroxyl ions ($OH^-$) to accelerate the condensation of the silica precursors. The electrode was then quickly removed from the solution and immediately rinsed with distilled water. The electrodeposited surfactant-template film was dried overnight in an oven at a temperature of about 130° C. Then, the extraction of surfactant was carried out by immersing the film in an ethanol (95%-96%) solution containing HCl (36%, 0.1 M) under moderate stirring for about 5 minutes. Subsequently, washing with water and blowing by nitrogen steps were followed.

Figure 5:
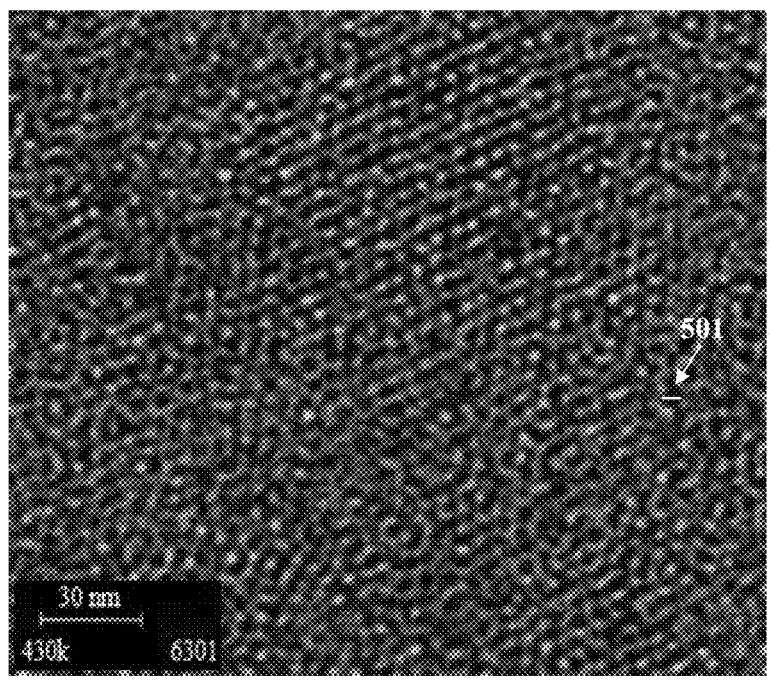
FIG. 5 illustrates a transmission electron microscopy (TEM) image of an exemplary prepared mesoporous silica template, consistent with one or more exemplary embodiments of the present disclosure.

FIG. 5 shows a transmission electron microscopy (TEM) image of exemplary prepared mesopores silica template. It may be observed that the fabricated mesoporous silica template includes highly ordered channels with a diameter of less than about 7 nm. For example, the diameter 501 shown in FIG. 5 is about 6.4 nm.

Example 2

Fabrication of Nanomotors

In this example, a plurality of exemplary nanomotors were fabricated within the channels of an exemplary mesoporous silica template fabricated in accordance with EXAMPLE 1 hereinabove. In the first step, a sacrificial layer of Prussian blue (PB) was deposited using chronoamperometry under the potential of about +0.3 V for about 5 minutes by immersing the oriented mesoporous silica modified electrode in a fresh solution containing $FeCl_3$ (0.1 mM), potassium ferricyanide ($K_3[Fe(CN)_6]$) (0.1 mM) and KCl (0.1 M) to penetrate inside the mesoporous channels of silica. In the second step, the modified electrode was immersed in a $NaNO_3$ (0.1 M) solution containing $Na_2PtCl_6$ (0.01 mM) and an electrical voltage of about −0.45 V was applied for about 10 minutes for electrochemical reduction of $Na_2PtCl_6$ inside the mesoporous channels of silica. In the third step, the obtained modified electrode was washed with water and immersed in $NiCl_2$ (0.005 mM) solution containing $H_3BO_3$ (0.1 M) with a pH value of about 3 and a voltage of about −1.1 V was applied for 5 minutes. In the fourth step, the modified electrode was washed with water and immersed in a $NaNO_3$ (0.1 M) solution containing $NaAuCl_4$ (0.01 mM) solution and a voltage of about −0.45 V was applied for about 20 minutes. The obtained modified electrode was then washed with water for about 10 seconds and heated at about 100° C. for about 1 hour. Finally, the obtained modified electrode was kept in NaOH (0.1 M) solution overnight to remove sacrificial layer and the silica matrix. After washing with pure water, nanorod shape motors were collected by magnetic force. The fabricated nanorod shape motor (Pt—Ni—Au) was fixed by magnetic force and rinsed thoroughly with water to wash away the adsorbed silicate. The fabricated nanomotors were stored in pure water (10 MΩ $cm^{-1}$) when they were not in use. All of the electrochemical reduction processes were carried out under stirring condition and in $N_2$ saturated solution. The characterization of nanomotors was examined by transmission electron microscopy (TEM) and energy-dispersive X-ray (EDX) spectroscopy. The electrochemical reduction processes were performed using an electrochemical system. A three-electrode was employed and assembled the cell, consisting of the oriented mesoporous silica modified graphite electrode (3.0 mm diameter) as the working electrode. Also, a platinum wire as a counter electrode and an Ag|AgCl|KClsat electrode as the reference electrode were used.

Figure 6A:
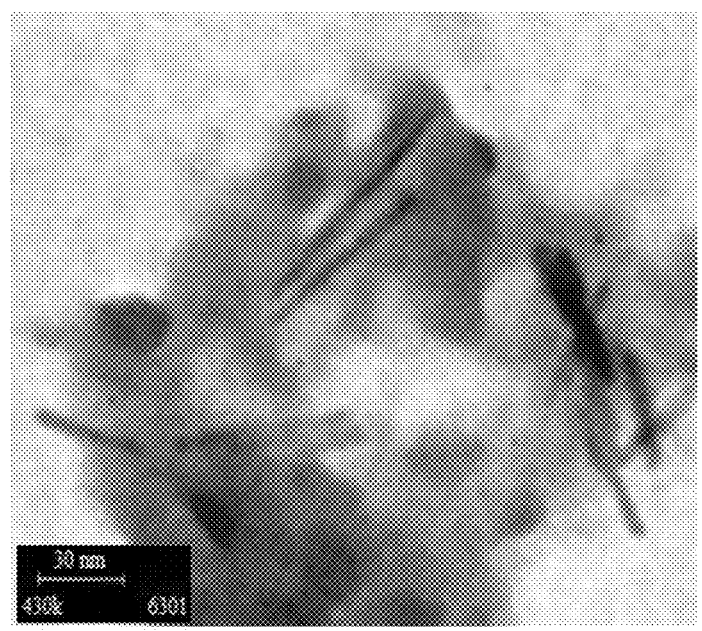
FIG. 6A illustrates a TEM image of the fabricated nanomotors, consistent with one or more exemplary embodiments of the present disclosure.

FIG. 6A shows a TEM image of exemplary fabricated nanomotors, consistent with one or more exemplary embodiments of the present disclosure. It may be seen that the prepared nanomotors have a rod structure. The width of the nanomotors may be estimated to be about 6 and the length of the nanomotors were estimated to be about 40 nm.

Figure 6B:
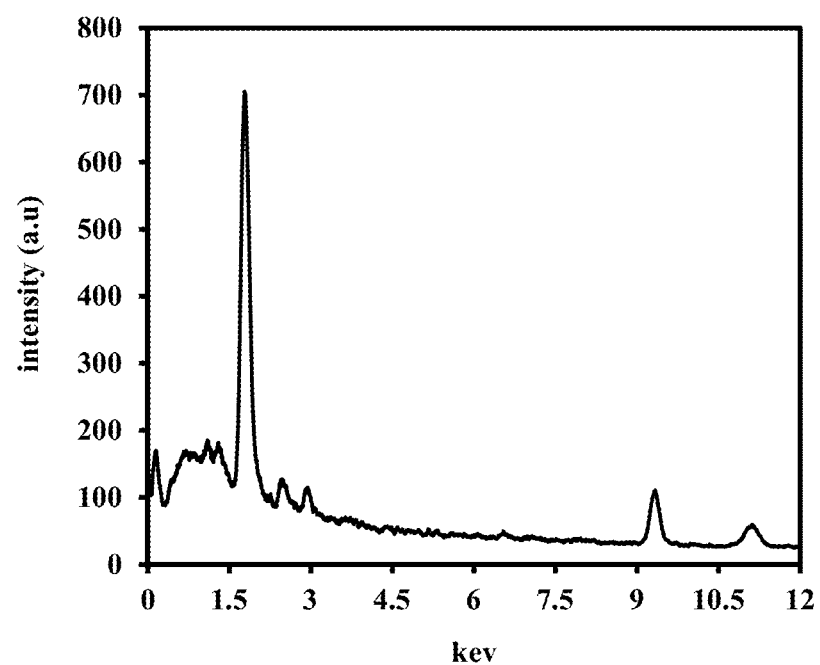
FIG. 6B illustrates an energy-dispersive X-ray (EDX) spectra of the fabricated nanomotors, consistent with one or more exemplary embodiments of the present disclosure.
Figure 7A:
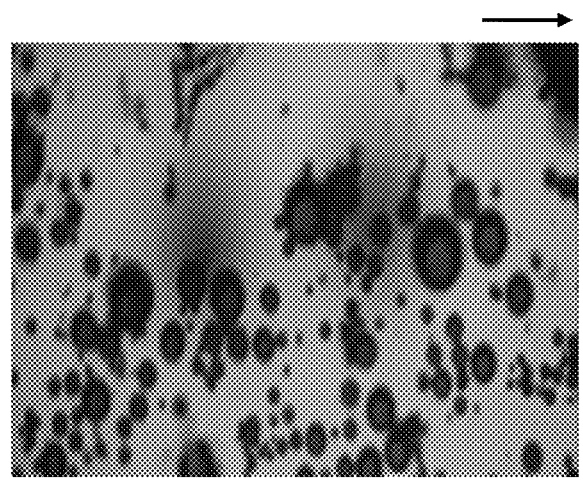
FIG. 7A illustrates the remote magnetic guidance of exemplary catalytic nanomotors in the presence of 1% $H_2O_2$ at time=0, consistent with one or more exemplary embodiments of the present disclosure.
Figure 7B:
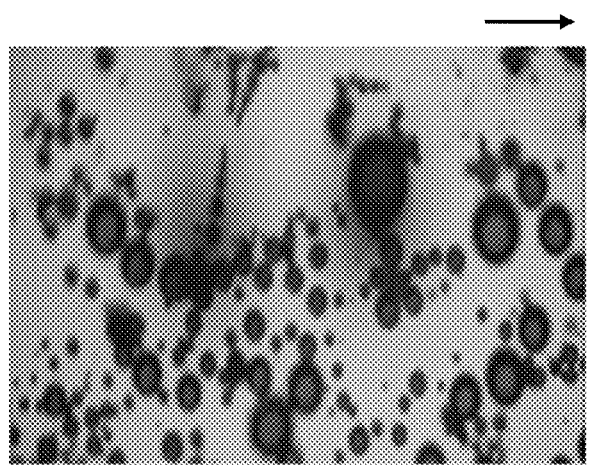
FIG. 7B illustrates the remote magnetic guidance of exemplary catalytic nanomotors in the presence of 1% $H_2O_2$ at time=1 second, consistent with one or more exemplary embodiments of the present disclosure.
Figure 7C:
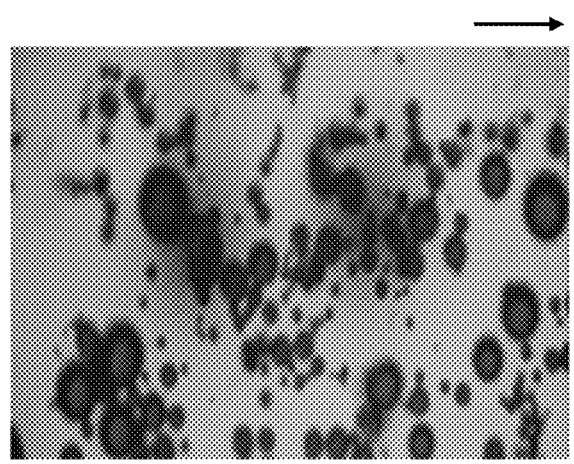
FIG. 7C illustrates the remote magnetic guidance of exemplary catalytic nanomotors in the presence of 1% $H_2O_2$ at time=2 seconds, consistent with one or more exemplary embodiments of the present disclosure.
Figure 7D:
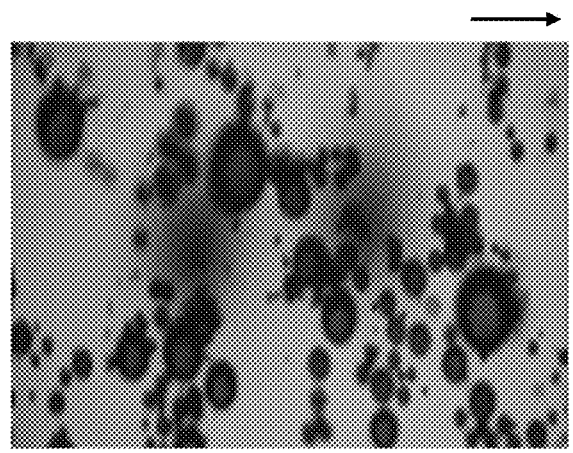
FIG. 7D illustrates the remote magnetic guidance of exemplary catalytic nanomotors in the presence of 1% $H_2O_2$ at time=3 seconds, consistent with one or more exemplary embodiments of the present disclosure.

FIG. 6B illustrates an EDX spectra of the fabricated nanomotors, consistent with one or more exemplary embodiments of the present disclosure. The elemental analysis of the obtained nanomotor carried out by EDX clearly indicated that the prepared nanorod contains about 53.2 wt % gold, about 12.4 Ni wt %, and about 34.4 wt % platinum.

Example 3

The Remote Control of Nanomotors

In this example, the fabricated nanomotors of EXAMPLE 2 were guided in a solution containing about 1% $H_2O_2$, as a fuel, by a magnetic force. A neodymium (NdFeB) magnet was used for magnetically controlled movement of the nanomotors.

FIGS. 7A-7D show a series of optical images demonstrating the route of the nanomotor with the elapse of time from FIG. 7A to FIG. 7D in a duration of about 1 second in the solution containing about 1% $H_2O_2$, as a fuel, via a magnetically guided movement, consistent with one or more exemplary embodiments of the present disclosure. As shown in FIGS. 7A-7D, in the presence of an external magnetic force, the catalytic nanomotors move towards the magnetic direction, wherein the arrows show the direction of the applied magnetic field.

Example 4

Application of Nanomotors for Surface Writing

In this example, an exemplary surface writing micro/nanostructure application of the prepared nanomotors according to EXAMPLE 2 relying on the magnetically guided movement of the exemplary nanomotors (Pt/Ni/Au) in 1% $H_2O_2$ solution containing MTMOS (0.1 mM) as a monomer for the fabrication of a sol-gel polymer matrix was carried out. Based on the exemplary method, the catalytic decomposition of $H_2O_2$ led to the generation of oxygen bubbles and hydrogen ions (Hf). The generated oxygen bubbles led to the motion of nanomotors. On the other hand, the generated hydrogen ions (Hf) serves as a catalyst agent necessary for the formation of a sol-gel film. Therefore, the magnetically guided motion of the nanomotors in a $H_2O_2$ solution containing MTMOS (0.1 mM) leads to the direct 'writing' of the sol-gel film along the nanomotor path.

Figure 8A:
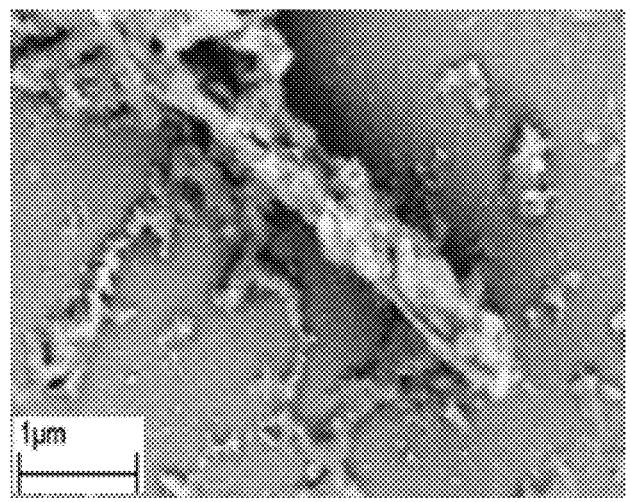
FIG. 8A illustrates a SEM image of the surface writing of exemplary formed sol-gel micro/nanostructures obtained by magnetically-guided motion of Pt—Ni—Au nanomotors in the presence of about 5% of $H_2O_2$, consistent with one or more exemplary embodiments of the present disclosure.
Figure 8B:
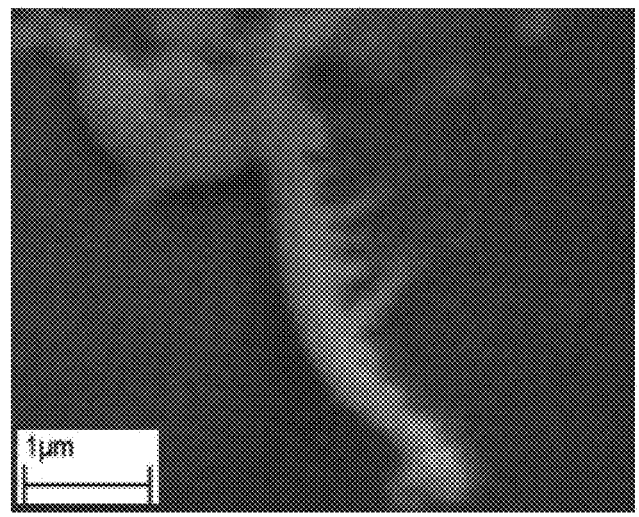
FIG. 8B illustrates a SEM image of the surface writing of exemplary formed sol-gel micro/nanostructures obtained by magnetically-guided motion of Pt—Ni—Au nanomotors in the presence of about 1% of $H_2O_2$, consistent with one or more exemplary embodiments of the present disclosure.

FIGS. 8A and 8B show SEM images of the surface writing of exemplary formed sol-gel micro/nanostructures which have been obtained by magnetically-guided motion of Pt—Ni—Au nanomotors in the presence of about 5% of $H_2O_2$ (FIG. 8A) and about 1% of $H_2O_2$ (FIG. 8B), consistent with one or more exemplary embodiments of the present disclosure. It may be seen that the concentration of hydrogen peroxide has an important role in the application of exemplary nanomotors at the surface writing micro/nanostructure. At higher $H_2O_2$ concentration (i.e., about 5%), the catalytic polymerization of the sol-gel film is very fast and fabrication process of the sol-gel film is not controllable. Thus, under this condition, the generation of the high amount of oxygen bubbles led to the creation of some defects in the fabrication of sol-gel film and, consequently, the resulting surface-writing on the sol-gel film was not quite clear as may be observed in FIG. 8A. While, at a lower $H_2O_2$ concentration (i.e., about 1%), the surface writing is obviously more clear as can be seen from FIG. 8B.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for surface writing, the method comprising:
    fabricating a plurality of nanomotors, comprising:
        preparing a mesoporous silica template, the mesoporous silica template comprising a plurality of channels, each channel of the plurality of channels with a diameter less than 50 nm and a length of less than 100 nm;
        forming the plurality of nanomotors within the mesoporous silica template, each nanomotor of the plurality of nanomotors formed within a channel of the plurality of channels; and
        separating the plurality of nanomotors from the mesoporous silica template;
    forming a secondary solution by adding the plurality of nanomotors to a primary solution placed on a substrate, the primary solution comprising a monomer and hydrogen peroxide ($H_2O_2$);
    guiding the plurality of nanomotors along a path in the secondary solution; and
    forming a sol-gel film along the path on a surface of the substrate.

2. The method of claim 1, wherein each nanomotor of the plurality of nanomotors comprises a nanorod with a diameter of less than 50 nm and a length of less than 100 nm, the nanorod comprising:
   a first segment comprising a metal from one of Platinum (Pt), Palladium (Pd), or combinations thereof; and
   a second segment comprising a magnetic material from one of Nickel (Ni), Cobalt (Co), alloys of Ni, alloys of Co, or combinations thereof.

3. The method of claim 2, wherein each nanomotor of the plurality of nanomotors comprises a nanorod with a diameter of less than 10 nm and a length of less than 50 nm.

4. The method of claim 3, wherein the nanorod further comprises:
   a third segment comprising Gold (Au),
wherein the second segment is placed between the first segment and the third segment.

5. The method of claim 1, wherein guiding the plurality of nanomotors along the path in the secondary solution comprises guiding the plurality of nanomotors along the path in the secondary solution utilizing a magnetic field.

6. The method of claim 1, wherein forming the sol-gel film along the path on the surface of the substrate comprises:
   forming the sol-gel film within the secondary solution due to a polymerization process of the monomer; and
   depositing the sol-gel film along the path on the surface of the substrate.

7. The method of claim 1, wherein $H_2O_2$ is present in the primary solution with a concentration of between 1% wt and about 5% wt of the primary solution.

8. The method of claim 1, wherein preparing the mesoporous silica template comprises:
   forming a mixture of tetraethoxysilane (TEOS) monomer and a surfactant, the surfactant comprising cetyltrimethylammonium bromide (CTAB);
   forming a hydrolyzed silica precursor within the mixture by aging the mixture while stirring at a pH value of 3; and
   depositing a film of the mesoporous silica template on a graphite electrode, comprising:
      immersing the graphite electrode in the mixture; and
      applying a voltage between −2.5 V and −2 V to the mixture.

9. The method of claim 1, wherein forming the plurality of nanomotors within the mesoporous silica template comprises:
   depositing a sacrificial layer on the mesoporous silica template within each channel of the plurality of channels, the sacrificial layer comprising a sacrificial material;
   depositing a first metal layer on the sacrificial layer, the first metal layer comprising one of Platinum (Pt), Palladium (Pd), or combinations thereof; and
   depositing a second metal layer on the first metal layer, the second metal layer comprising one of Nickel (Ni), Cobalt (Co), alloys of Ni, alloys of Co, or combinations thereof.

10. The method of claim 9, wherein depositing the sacrificial layer on the mesoporous silica template within each channel of the plurality of channels comprises:
   immersing the mesoporous silica template in a solution of the sacrificial material;
   forming a $N_2$-saturated solution of the sacrificial material by $N_2$ saturating of the solution of the sacrificial material; and
   applying a voltage between 0.2 V and 0.4 V to the $N_2$-saturated solution of the sacrificial material under stirring the $N_2$-saturated solution,
wherein the sacrificial material comprises one of Prussian blue (PB) (Iron hexacyanoferrate), Nickel hexacyanoferrate (NiHCF), Cobalt hexacyanoferrate (CoHCF), Copper hexacyanoferrate, or combinations thereof.

11. The method of claim 9, wherein depositing the first metal layer on the sacrificial layer comprises:
   immersing the mesoporous silica template with the sacrificial layer deposited within each channel of the plurality of channels in a first solution of a metal salt of one of Platinum (Pt), Palladium (Pd), or combinations thereof;
   forming a $N_2$-saturated first solution by $N_2$ saturating of the first solution; and
   applying a voltage between −0.5V and −0.4V to the $N_2$-saturated first solution under stirring the $N_2$-saturated first solution.

12. The method of claim 9, wherein depositing the second metal layer on the first metal layer comprises:
   immersing the mesoporous silica template with the first metal layer deposited on the sacrificial layer in a second solution of a magnetic material, the magnetic material comprising one of Nickel (Ni), Cobalt (Co), alloys of Ni, alloys of Co, or combinations thereof;
   forming a $N_2$-saturated second solution by $N_2$ saturating of the second solution; and
   applying a voltage between −1.2 V and −1 V to the $N_2$-saturated second solution.

13. The method of claim 9, wherein forming the plurality of nanomotors within the mesoporous silica template further comprises:
   depositing a third metal layer on the second metal layer, the third metal layer comprising Gold (Au).

14. The method of claim 13, wherein depositing the third metal layer on the second metal layer comprises:
   immersing the mesoporous silica template with the second metal layer deposited on the first metal layer in a third solution of Gold (Au);
   forming a $N_2$-saturated third solution by $N_2$ saturating of the third solution; and
   applying a voltage between −0.5 V and −0.4 V to the $N_2$-saturated third solution.

15. The method of claim 1, wherein separating the plurality of nanomotors from the mesoporous silica template comprises immersing the mesoporous silica template containing the plurality of nanomotors in an alkaline solution.

16. The method of claim 1, wherein separating the plurality of nanomotors from the mesoporous silica template comprises immersing the mesoporous silica template containing the plurality of nanomotors in a solution of Hydrogen Fluoride (HF).

17. A method for surface writing, the method comprising:
   adding a plurality of nanomotors to a primary solution placed on a substrate, the primary solution comprising:
      a monomer; and
      hydrogen peroxide ($H_2O_2$);
   guiding the plurality of nanomotors along a path in the primary solution; and
   forming a sol-gel film along the path on a surface of the substrate due to a polymerization of the monomer.

18. The method of claim 17, wherein each nanomotor of the plurality of nanomotors comprises a nanorod with a diameter of less than 10 nm and a length of less than 50 nm, the nanorod comprising:

a first segment comprising a metal, the metal comprising one of Platinum (Pt), Palladium (Pd), or combinations thereof; and a second segment comprising a magnetic material, the magnetic material comprising one of Nickel (Ni), Cobalt (Co), alloys of Ni, alloys of Co, or combinations thereof.

19. The method of claim 18, wherein each nanomotor of the plurality of nanomotors comprises a nanorod with a diameter of less than 10 nm and a length of less than 50 nm.

20. The method of claim 19, wherein the nanorod further comprises:

a third segment, the third segment comprising Gold (Au), wherein the second segment is placed between the first segment and the third segment.

* * * * *